US010756964B2

(12) United States Patent
Teo et al.

(10) Patent No.: US 10,756,964 B2
(45) Date of Patent: Aug. 25, 2020

(54) INTERNET OF THINGS CONFIGURATION METHOD AND SYSTEM FOR SECURE LOW-POWER-CONSUMPTION PROXY DEVICE

(71) Applicant: Espressif Systems (Shanghai) Co., Ltd., Shanghai (CN)

(72) Inventors: Swee Ann Teo, Shanghai (CN); Hao Lin, Shanghai (CN); Jiangjian Jiang, Shanghai (CN); Jian Lu, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 233 days.

(21) Appl. No.: 15/577,549

(22) PCT Filed: Dec. 29, 2015

(86) PCT No.: PCT/CN2015/099426
§ 371 (c)(1),
(2) Date: Nov. 28, 2017

(87) PCT Pub. No.: WO2016/192387
PCT Pub. Date: Dec. 8, 2016

(65) Prior Publication Data
US 2018/0176079 A1    Jun. 21, 2018

(30) Foreign Application Priority Data

May 29, 2015  (CN) ................. 2015 2 0360037 U
May 29, 2015  (CN) ................. 2015 2 0362178 U
Jul. 8, 2015   (CN) .................... 2015 1 0398333

(51) Int. Cl.
*H04L 12/24*       (2006.01)
*H04L 29/08*       (2006.01)
(Continued)

(52) U.S. Cl.
CPC .......... *H04L 41/0806* (2013.01); *H04L 29/08* (2013.01); *H04L 63/0884* (2013.01);
(Continued)

(58) Field of Classification Search
CPC ..... H04L 41/0806; H04L 29/08; H04L 67/12; H04L 63/0884; H04W 12/003;
(Continued)

(56) References Cited

U.S. PATENT DOCUMENTS 4,737,609 A      4/1988   Yuhasz et al.
7,962,775 B1 *   6/2011   Vaidyu ................. G06F 1/3203
                                                       713/323
(Continued)

FOREIGN PATENT DOCUMENTS

CN    101344985    1/2009
CN    102157054    8/2011
(Continued)

*Primary Examiner* — J. Brant Murphy
(74) *Attorney, Agent, or Firm* — Reinhart Boerner Van Deuren P.C.

(57) ABSTRACT

An IoT configuration method and system for secure low power consumption proxy devices, the method comprising: registering an intelligent terminal and securely bonding the intelligent terminal to a Wi-Fi IoT device; using a secure manner to configure one proxy device in the Wi-Fi IoT as a master proxy device or master device, and then using a point-to-multipoint manner to authenticate and configure other proxy devices in the Wi-Fi IoT through the master device; establishing a secure data path between the proxy device and a low power consumption Wi-Fi device; pairing the proxy device with the Wi-Fi low power consumption device in a Wi-Fi MAC layer connectionless mode; after a triggering condition is satisfied, said low power consumption device operating and transmitting control information to said proxy device, and the proxy device forwarding the received information or adjusting the states of other devices in the network according to the received information. The present invention provides an extensible, easily configurable, and secure IoT system.

22 Claims, 7 Drawing Sheets

(51) Int. Cl.
    *H04W 52/02* (2009.01)
    *H04W 12/00* (2009.01)
    *H04W 76/15* (2018.01)
    *H04L 29/06* (2006.01)
    *H04W 12/06* (2009.01)
    *H04W 84/12* (2009.01)
    *H04W 4/70* (2018.01)

(52) U.S. Cl.
    CPC .......... *H04L 67/12* (2013.01); *H04W 12/003* (2019.01); *H04W 12/06* (2013.01); *H04W 52/0209* (2013.01); *H04W 52/0219* (2013.01); *H04W 52/0229* (2013.01); *H04W 76/15* (2018.02); *H04L 63/0281* (2013.01); *H04W 4/70* (2018.02); *H04W 12/009* (2019.01); *H04W 84/12* (2013.01); *Y02D 70/10* (2018.01); *Y02D 70/14* (2018.01); *Y02D 70/142* (2018.01)

(58) Field of Classification Search
    CPC ......... H04W 52/0229; H04W 52/0219; H04W 52/0209; H04W 12/06; H04W 76/15
    See application file for complete search history.

(56) References Cited

U.S. PATENT DOCUMENTS

| | | | |
|---|---|---|---|
| 2004/0233855 A1* | 11/2004 | Gutierrez | H04L 45/00 370/252 |
| 2005/0141498 A1 | 6/2005 | Cam Winget et al. | |
| 2009/0070857 A1 | 3/2009 | Azuma | |
| 2011/0249571 A1* | 10/2011 | Das | H04W 88/182 370/252 |
| 2013/0332627 A1* | 12/2013 | Skog | H04W 4/70 709/244 |
| 2015/0312705 A1 | 10/2015 | Pan et al. | |
| 2016/0294828 A1 | 10/2016 | Zakaria | |

FOREIGN PATENT DOCUMENTS

| | | | |
|---|---|---|---|
| CN | 102484751 | | 5/2012 |
| CN | 202615143 | | 12/2012 |
| CN | 102860133 | | 1/2013 |
| CN | 202773156 | | 3/2013 |
| CN | 103329629 | | 9/2013 |
| CN | 103546909 | | 1/2014 |
| CN | 103763164 | A | 4/2014 |
| CN | 103841658 | | 6/2014 |
| CN | 103957580 | | 7/2014 |
| CN | 103997829 | | 8/2014 |
| CN | 104133408 | | 11/2014 |
| CN | 104202308 | A * | 12/2014 |
| CN | 104202308 | A | 12/2014 |
| CN | 104206001 | | 12/2014 |
| CN | 104618900 | | 5/2015 |
| CN | 104883724 | | 9/2015 |
| CN | 104955241 | A | 9/2015 |
| CN | 104968037 | A | 10/2015 |
| CN | 204721613 | | 10/2015 |
| CN | 204721613 | U | 10/2015 |
| CN | 105101456 | A | 11/2015 |
| CN | 204836236 | U | 12/2015 |
| CN | 105981352 | | 9/2016 |
| JP | 2003109778 | | 4/2003 |

* cited by examiner

INTERNET OF THINGS CONFIGURATION METHOD AND SYSTEM FOR SECURE LOW-POWER-CONSUMPTION PROXY DEVICE

TECHNICAL FIELD

The present invention relates to the technical field of the Internet of Things, particularly to a Wi-Fi IoT system and a method for implementing secure connection and low power consumption proxy among various devices within the system.

BACKGROUND ART

IoT is an abbreviation for Internet of Things (IoT). An IoT device may be various types of information sensors and controllers, and may also be various types of smart home appliances. IoT devices access internet through a variety of ways, form a huge network, and realize the extension of the internet from people to things.

Wi-Fi IoT access mode is one of the most widely used IoT access modes with lowest cost and best extensibility. Usually, a Wi-Fi IoT device accesses network directly via a Wi-Fi access point (Wi-Fi AP, also called Wi-Fi hotspot or wireless router).

Currently, the development of IoT faces a pile of difficulties, among which security problem is ranked near the top, and nowadays, the increasing complexities of communication standards and systems due to the advent of IoT, makes the secure problem more prominent. The control of a Wi-Fi IoT device usually includes accessing network based on Wi-Fi connection, activating the device with a cloud server, and a user may use an intelligent terminal at anywhere to access the cloud server, and remotely query and control a device at home. A lot of home or commercial Wi-Fi IoT device have emerged in the market, and products such as intelligent monitoring, wireless positioning, intelligent control has appeared in real life scenarios of the public. Technical problems worth to be explored may include how to establish secure connections among various types of IoT devices, cloud servers, intelligent terminals (users), and ensure information security of the system.

SUMMARY OF THE INVENTION

With regard to the above described defects in the prior arts, the present invention proposes an IoT configuration method and system for secure low power consumption proxy devices, which may improve ease of use and availability of IoT devices, and solve the power consumption problem and the network security problem.

The present invention is implemented through the following technical solution:

An IoT configuration method for secure low power consumption proxy devices comprises:

registering an intelligent terminal and securely bonding the intelligent terminal to a Wi-Fi IoT device;

using a secure manner to configure one proxy device in the Wi-Fi IoT as a master proxy device or master device, and then using a point-to-multipoint manner to authenticate and configure other proxy devices in the Wi-Fi IoT through the master device;

establishing a secure data path between the proxy device and a low power consumption Wi-Fi device;

pairing the proxy device with the Wi-Fi low power consumption device in a Wi-Fi MAC layer connectionless mode;

after a triggering condition is satisfied, said low power consumption device operating and transmitting control information to said proxy device, and the proxy device forwarding the received information or controlling other devices according to the received information.

The step of registering an intelligent terminal and securely bonding the intelligent terminal to a Wi-Fi IoT device comprises:

an activation process, which registers the intelligent terminal with a cloud server upon a first time connection;

an authentication process, which reactivates and authenticates the intelligent terminal with the cloud server through identity information.

The step of using a secure manner to configure one proxy device in the Wi-Fi IoT as a master proxy device or master device, and then using a point-to-multipoint manner to authenticate and configure other proxy devices in the Wi-Fi IoT comprises:

when a user uses the intelligent terminal to discover a master device in a Wi-Fi Soft-AP mode, the intelligent terminal connects with the master device in an encryption mode; then the user transmits configuration information from the intelligent terminal to an IoT device;

when the master device is connected via a wireless router to an IoT cloud server via an encryption protected link and enters into an operating mode, the master device uses the Wi-Fi Soft-AP mode to allow access from other proxy devices which are in the same group and in a waiting-for-configuration mode, while the other proxy devices use a Wi-Fi STA mode to seek and try to access the master device.

The step of pairing the proxy device with the Wi-Fi low power consumption device in a Wi-Fi MAC layer connectionless mode comprises:

the Wi-Fi low power consumption device receiving information packets from different proxy devices in a wireless manner;

the Wi-Fi low power consumption device sending an instruction corresponding to a MAC address of the proxy device;

pairing the Wi-Fi low power consumption device with the proxy device.

Said information packets comprise: waiting-for-configuration query information packet, response information packet, indication instruction information packet, or encryption information packet, wherein:

said waiting-for-configuration query information packet comprises: a query for illumination device locking state or a number of paired switches;

said response information packet comprises: a response to the waiting-for-configuration query information packet;

said indication instruction information packet comprises: a MAC address of the illumination device, a flash frequency or hold time of the illumination device;

said encryption information packet comprises: a communication key or an encryption mode.

The step of the Wi-Fi low power consumption device receiving information packets from different proxy devices in a wireless manner comprises:

the Wi-Fi low power consumption device to be paired sending the waiting-for-configuration query information packet to the proxy devices;

the proxy devices which receive the waiting-for-configuration query information packet sending a response information packet;

said Wi-Fi low power consumption device receiving the response information packets containing a MAC address;

said Wi-Fi low power consumption device filtering configurable proxy devices based on waiting-for-configuration state information in the response information packets;

said Wi-Fi low power consumption device sorting the obtained MAC addresses of the configurable proxy devices according to RSSI values obtained when receiving the response information packets.

When said Wi-Fi low power consumption device sorts the obtained MAC addresses of the configurable proxy devices, MAC addresses with larger RSSI value take higher priority.

The step of the Wi-Fi low power consumption device sending an indication instruction corresponding to a MAC address of the proxy device comprises:

the Wi-Fi low power consumption device to be paired sending the indication instruction information packet to the proxy devices according to an order of RSSI value's priority;

after having received the indication instruction information packet, the proxy device gives a light indication or sound, action as confirmation.

The step of pairing the Wi-Fi low power consumption device with the proxy device comprises:

the Wi-Fi low power consumption device receiving corresponding information packets from different proxy devices in a wireless manner;

the Wi-Fi low power consumption device sending an indication instruction corresponding to the MAC address of the proxy device so as to facilitate the user in determining a device to be paired from a plurality of proxy devices and perform pairing.

The method further comprises the following step of:

the Wi-Fi low power consumption device sending a pairing locking instruction to the proxy device, so as to lock the proxy device.

The step of the Wi-Fi low power consumption device sending a pairing locking instruction to the proxy device so as to lock the proxy device comprises:

the Wi-Fi low power consumption device sending an information packet carrying the locking instruction to the proxy device paired therewith;

after having received the information packet carrying the locking instruction, the proxy device updating its own state to paired-and-locked.

The method further comprises the following step of:

the paired Wi-Fi low power consumption device sending an unlock instruction information packet to the proxy device, so as to unlock the proxy device.

The step of the paired Wi-Fi low power consumption device sending an unlock instruction information packet to the proxy device so as to unlock the proxy device comprises:

the Wi-Fi low power consumption device sending locking instruction information packets to all proxy devices paired therewith;

the proxy devices receiving the locking instruction information packets, and updating their own states to a waiting-for-pairing state.

After a triggering condition is satisfied, said low power consumption device operates and transmits control information to said proxy device, the steps of the proxy device forwarding the received information or controlling other devices according to the received information comprising:

loading data in a packet payload structure defined in MAC layer of a Wi-Fi low power consumption device, performing data pre-exchange with the proxy device via a MAC layer link;

the proxy device using the data received in the pre-exchange to perform data interaction with the cloud server via IP layer and above layer link through the IP address and high level protocol specified in packet payload in MAC layer.

After a triggering condition is satisfied, said low power consumption device operates and transmits control information to said proxy device, and the step of the proxy device forwarding the received information to other devices or controlling other devices according to the received information includes:

the proxy device acting as a data receiving end to receive and buffer data sent from the cloud server, and after a current low power consumption sleeping state of the Wi-Fi low power consumption device is ended, transmitting the buffered internet data via the previously established low power consumption Wi-Fi MAC layer link.

The method further comprises the following steps of:

when the Wi-Fi low power consumption device is about to enter into the low power consumption sleeping state, loading a sleep start signal to be sent to the proxy device in the MAC packet payload to be sent;

when the Wi-Fi low power consumption device exits the low power consumption sleeping state and needs to transmit data over the previously established low power consumption Wi-Fi MAC layer link, loading a sleep end signal in the MAC packet payload to be sent and sending the sleep end signal;

the proxy device periodically listening to the above described sleep start signal and sleep end signal, and correspondingly starting an internet data buffering process or pre-exchange data forwarding process between the proxy device and the cloud server.

When the Wi-Fi low power consumption device ends sleeping and is ready to transmit data, if its sleeping time does not exceeds a maximum wake-up period of the low power consumption Wi-Fi MAC layer link, then the low power consumption Wi-Fi MAC layer link between the device and the IoT proxy device has not been disconnect, so data pre-exchange can be performed directly via the previous low power consumption Wi-Fi MAC layer link;

when the sleeping time exceeds the maximum wake-up period set for the low power consumption Wi-Fi MAC layer link, then the low power consumption Wi-Fi MAC layer link between the device and the IoT proxy device has been disconnected, and it is needed to firstly establish the link according to the above described process for establishing the low power consumption Wi-Fi MAC layer link, and then perform data pre-exchange over the low power consumption Wi-Fi MAC layer link.

A system for implementing the IoT configuration method for secure low power consumption proxy devices as described above comprises:

an intelligent terminal;

a cloud server, which performs data storage of user information;

a wireless router, which connects said Wi-Fi IoT device and said cloud server;

a Wi-Fi low power consumption device, which sends control information by way of loading a private information structure in a Wi-Fi unicast packet or multicasting packet;

a proxy device, which performs wireless connection and pairing by way of receiving the control information from said Wi-Fi low power consumption device, and said proxy device can send information packet to said Wi-Fi low power consumption device, and receive the indication instruction corresponding to the MAC address of said proxy device sent from said Wi-Fi low power consumption device.

Said information packets comprise:

waiting-for-configuration query information packet, response information packet, indication instruction information packet, or encryption information packet, wherein:

said waiting-for-configuration query information packet includes: query proxy device locking state or a number of paired low power consumption devices;

said response information packet includes: a response to the waiting-for-configuration query information packet;

said indication instruction information packet includes: the MAC address of the proxy device, a flash frequency, hold time or sound, action information of the proxy device;

said encryption information packet includes: a communication key or an encryption mode.

Said Wi-Fi low power consumption device comprises:

a query information transmitting module, which sends a waiting-for-configuration query information packet to the proxy devices;

a response information receiving module, which receives response information packets containing MAC addresses sent from said proxy devices;

a storage module, which stores said the response information packets containing the MAC addresses;

a determination module, which determines configurable proxy devices according to waiting-for-configuration state information in the response information packets;

a comparison module, which sorts the obtained MAC addresses of the configurable proxy devices according to RSSI values of the response information packets, and generates a list of MAC addresses waiting for configuration;

an indication instruction transmitting module, which sends an indication instruction information packet to said proxy devices;

a control information transmitting module, which sends control information to said proxy devices;

a control information receiving module, which receives the control information for said proxy devices.

Said Wi-Fi low power consumption device further comprises:

a locking instruction transmitting module, which sends a pairing locking instruction information packet;

an unlocking instruction transmitting module, which sends an unlocking instruction information packet;

a sleep start transmitting module which, when said Wi-Fi low power consumption device is about to enter into the low power consumption sleeping state, loads a sleep start signal to be sent to the proxy device into the MAC packet payload to be sent;

a sleeping end transmitting module which, when said Wi-Fi low power consumption device exits the low power consumption sleeping state, loads a sleep end signal into the MAC packet payload to be sent and sends the sleep end signal.

Said proxy device comprises:

a query information receiving module, which receives the waiting-for-configuration query information packet sent from the Wi-Fi low power consumption device;

a response information transmitting module, which transmits a response information packet containing the MAC address;

an instruction receiving module, which receives the instruction information packet sent from said Wi-Fi low power consumption device;

an instruction execution module, which executes the received instruction;

a receiving module, which receives control information sent from said Wi-Fi low power consumption device and data sent from said cloud server;

a buffer module which, when the Wi-Fi IoT device is in the low power consumption sleeping state, stores data sent from said cloud server;

a transmitting module, which sends the data sent from the cloud server and stored by said buffer module to said Wi-Fi low power consumption device.

Said proxy device further comprises:

a locking instruction receiving module, which receives a pairing locking instruction information packet;

an unlocking instruction transmitting module, which receives an unlocking instruction information packet;

a sleep start receiving module, which receives the sleep start signal sent from said Wi-Fi low power consumption device;

a sleeping end receiving module, which receives the sleep end signal sent from said Wi-Fi low power consumption device.

Technical Effects

As compared with the prior arts, the present invention integrates Wi-Fi IoT devices that need to keep a long term connection with the cloud server or need to transmit large amount of data and Wi-Fi low power consumption devices having a long data period into one system, which solves the power consumption problem of IoT underlying devices, and at the same time implements effective security protection to whole processes of access from new devices in network establishment and operation, and fully utilizes functional features of various types of devices to provide an extensible, easily configurable, and secure IoT system.

BRIEF DESCRIPTION OF THE DRAWINGS

The present invention will be described in more detail in the following with reference to the embodiments and the accompanied drawings, in which.

DETAILED DESCRIPTION OF THE EMBODIMENTS

In the following, an embodiment of the present invention will be described in detail; the present embodiment is implemented according to the technical solution of the present invention, illustrating detailed implementation and specific operation processes. The scope of protection of the present invention is not limited to the embodiment described as follows.

Figure 1:
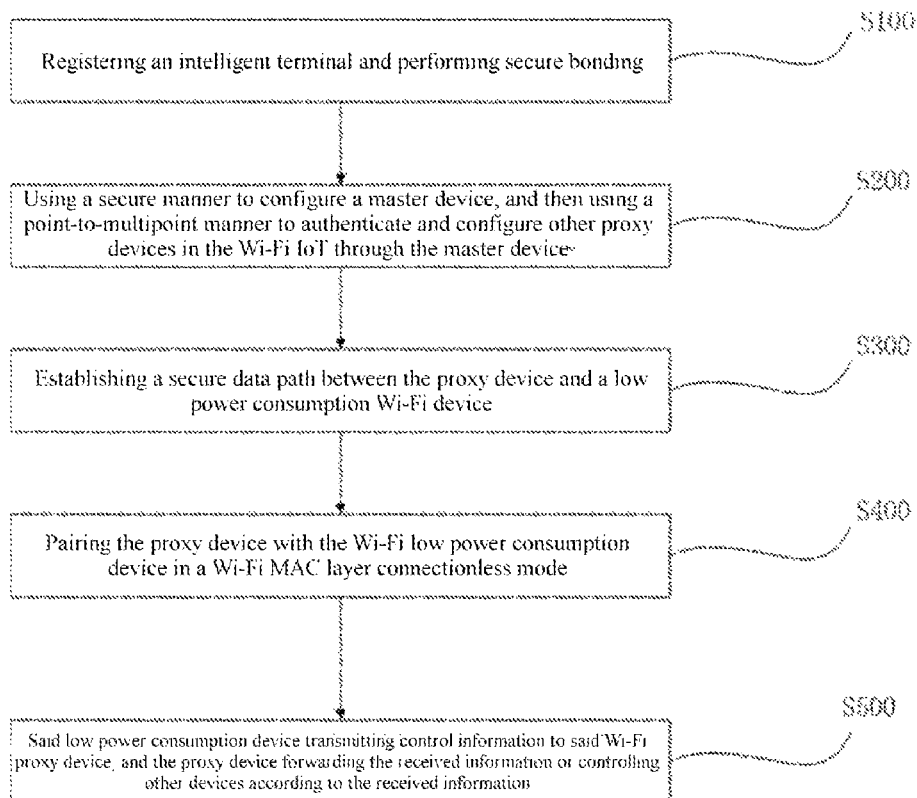
FIG. 1 to FIG. 10 are exemplary flow charts of an IoT configuration method for secure low power consumption proxy devices according to the present invention.

As shown in FIG. 1, the present invention discloses an IoT configuration method for secure low power consumption proxy devices, comprising: step S100, registering an intelligent terminal and securely bonding the intelligent terminal to a Wi-Fi IoT device; step S200, using a secure manner to configure one proxy device in the Wi-Fi IoT as a master proxy device or master device, and then using a point-tomultipoint manner to authenticate and configure other proxy devices in the Wi-Fi IoT through the master device; step S300, establishing a secure data path between the proxy device and a low power consumption Wi-Fi device; step S400, pairing the proxy device with the Wi-Fi low power consumption device in a Wi-Fi MAC layer connectionless mode; step S500, after a triggering condition is satisfied, said low power consumption device operating and transmitting control information to said proxy device, and the proxy device forwarding the received information or controlling other devices according to the received information.

The present invention integrates Wi-Fi IoT devices that need to keep a long term connection with the cloud server or need to transmit large amount of data and Wi-Fi low power consumption devices having a long data period into one system, which solves the power consumption problem of IoT underlying devices, and at the same time implements effective security protection to whole processes of access from new devices in network establishment and operation, and fully utilizes functional features of various types of devices to provide an extensible, easily configurable, and secure IoT. A Wi-Fi IoT device is an IoT device that may be connected through Wi-Fi, and in the present invention, Wi-Fi IoT device includes Wi-Fi low power consumption device and proxy device, and may also be other device not acting as a proxy device.

A proxy device in the present invention is an electronic device having Wi-Fi function, which is exemplified in the present invention as a Wi-Fi illumination device, namely Wi-Fi lamp.

Figure 2:
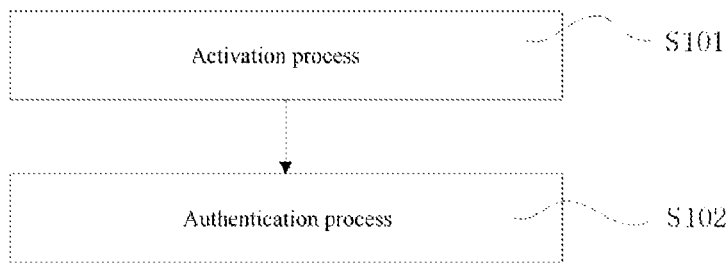

As shown in FIG. 2, at step S100 of the present invention, the step of registering an intelligent terminal and securely bonding the intelligent terminal to a Wi-Fi IoT device comprises:

step S101, activation process; which is a first time connection, and registers the intelligent terminal with the cloud server, and controls the proxy device to connect with an AP and access internet; step S102, authentication process, which reactivates and authenticates the intelligent terminal with the cloud server through identity information, and implements device bonding through obtaining a key of the proxy device.

This step specifically includes:

Activation process stage 1: an initial state of the proxy device is Soft AP+STA coexistence mode, and a Soft AP interface broadcasts one beacon every 100 ms. The intelligent terminal receives the beacon at an underlying layer to know information about a nearby AP, and scans and filters SoftAP information of proxy devices, which will be display in a device list. After the user selects a certain proxy device in the list for connection, the intelligent terminal requests a connection password of the proxy device from the cloud server. The cloud server determines the proxy device does not have an owner, then it returns the password of the proxy device in the response; if the proxy device has a valid owner, then the cloud server returns connection failure information to the intelligent terminal. The intelligent terminal connects through the Soft AP interface of the proxy device according to the password returned by the cloud server.

Activation process stage 2: the intelligent terminal sends an instruction to the proxy device, so as to control the STA interface of the proxy device to connect with a specified AP; the instruction contains but not limited to the following parameters: SSID, password, and a unique key of the AP to be connected. After the proxy device receives the above described instruction, it connects to the AP according to the parameters in the instruction, and connects to an external network through the AP. During this process, the intelligent terminal may about progress of connection to the AP through the Soft AP interface of the proxy device. The intelligent terminal may similarly connect to the AP, and connect to the external network through the AP.

Authentication process stage 1: the proxy device sends data to the cloud server, including but not limited to: unique identity information and the above described unique key, so as to perform activation with the cloud server. After the cloud server receives the information, it approves the activation of the proxy device, and sends a response to the proxy device. The proxy device sends data to the cloud server, including but not limited to: unique identity information, so as to perform authentication. The cloud server authenticates the identity information of the proxy device, and sends a response to the proxy device confirming that identity verification is successful.

Authentication process stage 2: the intelligent terminal sends an instruction to the cloud server, requesting authorization, the instruction including but not limited to: unique identity identification information of the user obtained when the current user of the intelligent terminal performs registration with the cloud server, and the above described unique key. The cloud server responds to the intelligent terminal with a data packet, the data packet containing but not limited to a key representing privileges of the owner of the proxy device, and authorizes the identity of the owner of the proxy device to the current user of the intelligent terminal. After authorization, the cloud server may record the current user as the owner of the proxy device, and if thereafter another user wants to use the proxy device without authorization, it will fail in steps of stage 1. Subsequently, when the intelligent terminal or the proxy device are to communicate with the cloud server, they both need to connect the internet through the AP.

In this step, the connect process contains only one-to-one communication, and in order for the cloud server to record information such as key, device privileges, and user identity, it is needed to pass the authentication by the cloud server for smooth execution, so as to ensure the security of the content of communication. Meanwhile, ease of use is also provided to the user: the user may use a mobile phone APP or other intelligent terminal to select proxy device, configure the SSID and password of the AP, and then a whole set of connection authorization processes can be automatically completed.

Figure 3:
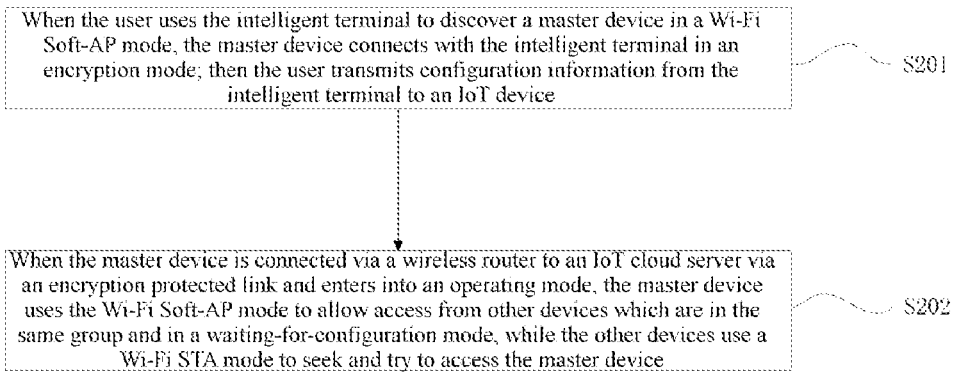

As shown in FIG. 3, step S200, the step of using a secure manner to configure one proxy device in the Wi-Fi IoT as a master proxy device or master device, and then using a point-to-multipoint manner to to authenticate and configure other proxy devices in the Wi-Fi IoT through the master device comprises: step S201, when the user uses the intelligent terminal to discover a master device in a Wi-Fi Soft-AP mode, the master device connects with the intelligent terminal in an encryption mode; then the user transmits configuration information from the intelligent terminal to an IoT device; step S202, when the master device is connected via a wireless router to an IoT cloud server via an encryption protected link and enters into an operating mode, the master device uses the Wi-Fi Soft-AP mode to allow access from other proxy devices which are in the same group and in a waiting-for-configuration mode, while the other proxy devices use a Wi-Fi STA mode to seek and try to access the master device.

This step specifically includes: firstly using a secure manner to configure one of the Wi-Fi proxy devices as a master proxy device or master device. For example, through a conventional method, the intelligent terminal discovers and connects to the IoT device operating as a Wi-Fi access point, which is called master device. A connection between the master device in the Soft-AP mode and intelligent terminal should use encryption modes such as WPS, WAPI or WPA/WPA2. Then, configuration information (including the encryption mode and encryption password of the wireless router needed to be used when the IoT device is in an operating state) may be transmitted to the IoT device through a webpage or mobile phone software APP. The master device enters into the operating mode, and has connected to the IoT cloud server via the wireless router, and the whole link is encryption protected. Other Wi-Fi IoT devices are still in the waiting-for-configuration mode. The master device uses Soft-AP function to allow access from other Wi-Fi IoT devices in the same group, and further other devices use Wi-Fi STA function to seek and try to access the master device. When the Wi-Fi IoT device automatically discovers that the master device has completed configuration, it will use Wi-Fi STA function to connect with the master device, and sends a request to the master device. The IoT cloud server, the intelligent terminal or the authenticated master device are Wi-Fi IoT devices in the same group, then sends data packets containing configuration information through the master device to a non-authenticated proxy device, and these data packets have to be encrypted. Thus, the non-authenticated proxy device may automatically complete initial configuration and enters into the operating mode and connects to the internet, and completes authentication. Similarly, other proxy devices may complete configuration through the master device or the authenticated device. The configuration of the whole Wi-Fi IoT may therefore be rapidly completed in an exponential manner. Wi-Fi IoT devices in the same group means they are connected to the same IoT cloud server S and belongs to the same user. After the network backbone is established, the mobile phone intelligent terminal software may randomly generate a new encryption password to send and notify the Wi-Fi intelligent lamp 1, lamp 2, lamp 3, and lamp 4 to uniformly update WPA/WPA2 password to be used for data connection, and replace the factory default connection passwords used by the devices in the network; after the password update is completed, the mobile phone sends the encryption password to the cloud server in a data encryption manner via a secure connection, and the cloud server updates its stored BSSID and WPA/WPA2 password information of the Wi-Fi IoT device.

Figure 4:
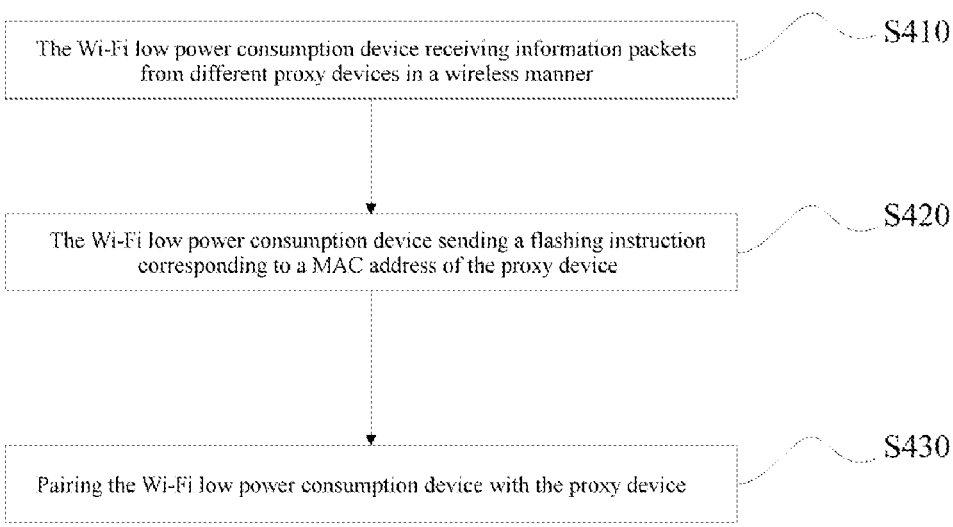

As shown in FIG. 4, step S400 of the present invention, pairing the proxy device with the Wi-Fi low power consumption device in a Wi-Fi MAC layer connectionless mode, specifically includes the following step of: S410, the Wi-Fi low power consumption device receiving information packets from different proxy devices in a wireless manner; S420, the Wi-Fi low power consumption device sending an indication instruction corresponding to a MAC address of the proxy device; S430, pairing the Wi-Fi low power consumption device with the proxy device.

Said information packets include: waiting-for-configuration query information packet, response information packet, indication instruction information packet, or encryption information packet, wherein said waiting-for-configuration query information packet comprises: a query for illumination device locking state or a number of paired switches; said response information packet comprises: a response to the waiting-for-configuration query information packet; said indication instruction information packet comprises: a MAC address of the illumination device, a flash frequency or hold time of the illumination device; said encryption information packet comprises: a communication key or an encryption mode.

An IoT configuration method for secure low power consumption proxy devices according to the present invention can implement a method and apparatus for MAC layer pairing between a wiring free Wi-Fi IoT illumination switch and a standard Wi-Fi IoT illumination device, utilize a limited number of buttons and indicator lights on the wiring free Wi-Fi IoT illumination switch, to control the Wi-Fi IoT illumination switch by way of preset buttons, and implement a pairing process with a user-selected Wi-Fi IoT illumination device.

Figure 5:
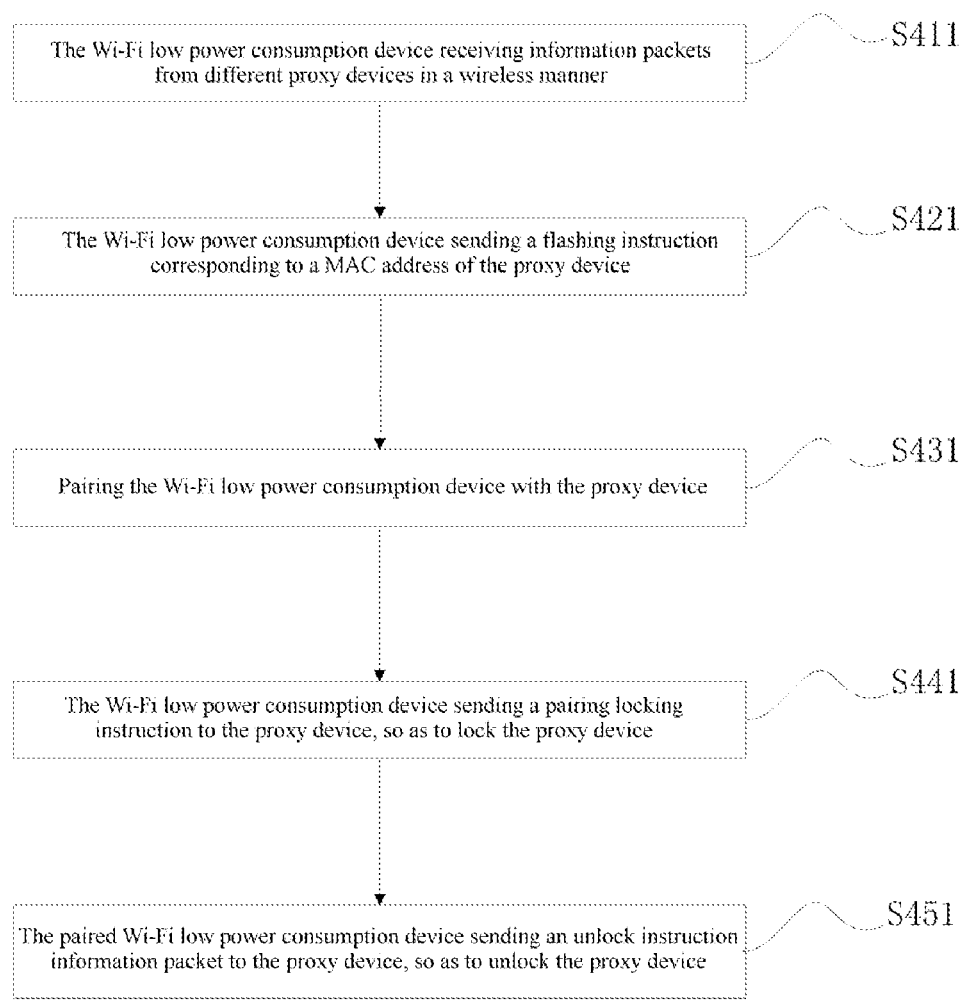

As shown in FIG. 5, the step S400 of the present invention, pairing the proxy device with the Wi-Fi low power consumption device in a Wi-Fi MAC layer connectionless mode, specifically includes: step S411, the Wi-Fi low power consumption device receiving information packets from different proxy devices in a wireless manner; step S421, the Wi-Fi low power consumption device sending an indication instruction corresponding to a MAC address of the proxy device; step S431, pairing the Wi-Fi low power consumption device with the proxy device; step S441, the Wi-Fi low power consumption device sending a pairing locking instruction to the proxy device, so as to lock the proxy device; step S451, the paired Wi-Fi low power consumption device sending an unlock instruction information packet to the proxy device, so as to unlock the proxy device.

Figure 6:
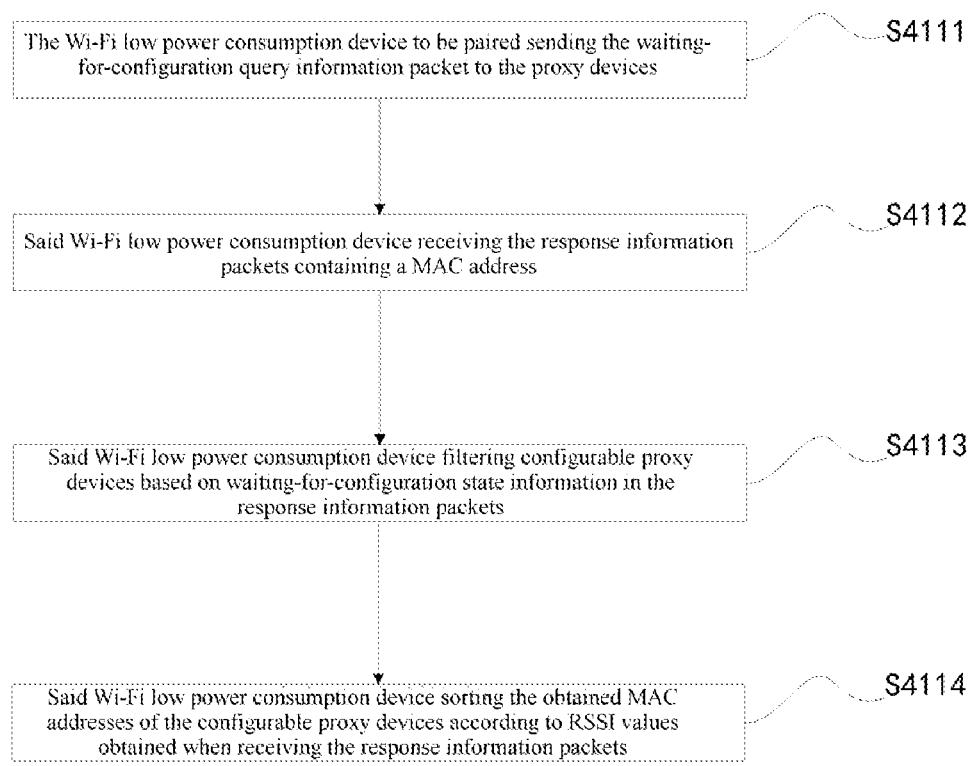

As shown in FIG. 6, in the present invention, the step of the Wi-Fi low power consumption device receiving information packets from different proxy devices in a wireless manner comprises:

step S4111, the Wi-Fi low power consumption device to be paired sending the waiting-for-configuration query information packet to the proxy devices; step S4112, said Wi-Fi low power consumption device receiving the response information packets containing a MAC address; step S4113, said Wi-Fi low power consumption device filtering configurable proxy devices based on waiting-for-configuration state information in the response information packets; step S4114, said Wi-Fi low power consumption device sorting the obtained MAC addresses of the configurable proxy devices according to RSSI values obtained when receiving the response information packets. Here, when said Wi-Fi low power consumption device sorts the obtained MAC addresses of the configurable proxy devices, MAC addresses with larger RSSI value take higher priority.

Figure 7:
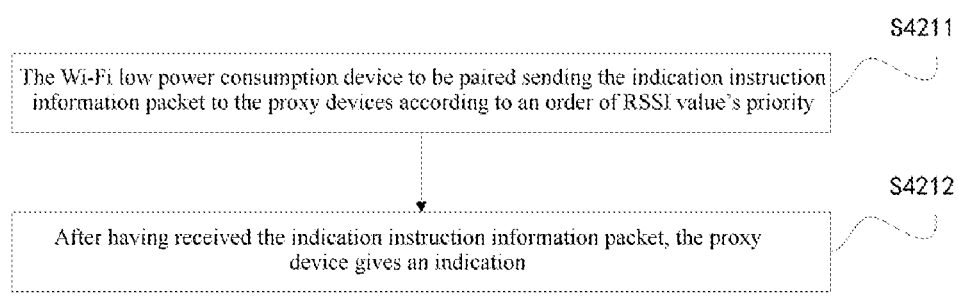

As shown in FIG. 7, the step of the Wi-Fi low power consumption device sending an indication instruction corresponding to a MAC address of the proxy device comprises:

Step S4211, the Wi-Fi low power consumption device to be paired sending the indication instruction information packet to the proxy devices according to an order of RSSI value's priority; step S4212, after having received the indication instruction information packet, the proxy device gives a light indication.

Figure 8:
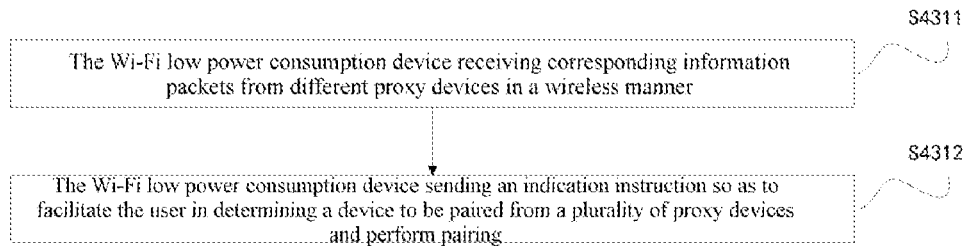

As shown in FIG. 8, the step of pairing the Wi-Fi low power consumption device with the proxy device comprises: step S4311, the Wi-Fi low power consumption device receiving corresponding information packets from different proxy devices in a wireless manner; step S4312, the Wi-Fi low power consumption device sending an indication instruction corresponding to the MAC address of the proxy device so as to facilitate the user in determining a device to be paired from a plurality of proxy devices and perform pairing.

Figure 9:
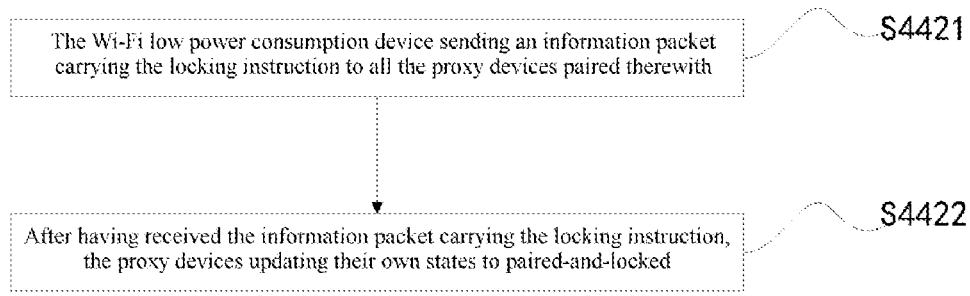

As shown in FIG. 9, the step of the Wi-Fi low power consumption device sending a pairing locking instruction to the proxy device so as to lock the proxy device comprises:

step S4421, the Wi-Fi low power consumption device sending an information packet carrying the locking instruction to the proxy devices paired therewith; step S4422, after having received the information packet carrying the locking instruction, the proxy devices updating their own states to paired-and-locked.

Figure 10:
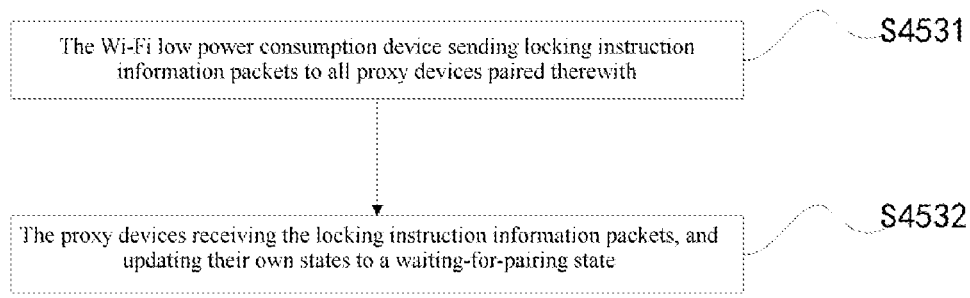

As shown in FIG. 10, the step of the paired Wi-Fi low power consumption device sending an unlock instruction information packet to the proxy device so as to unlock the proxy device comprises:

Step S4531, the Wi-Fi low power consumption device sending locking instruction information packets to all proxy devices paired therewith; step S4532, the proxy devices receiving the locking instruction information packets, and updating their own states to a waiting-for-pairing state.

In the present invention, the step of pairing the proxy device with the Wi-Fi low power consumption device in a Wi-Fi MAC layer connectionless mode specifically includes:

1) when their own states of the proxy device and the Wi-Fi low power consumption device are both a waiting-for-pairing state, the Wi-Fi low power consumption device will start query search, specifically: the user presses and holds a configuration button of the Wi-Fi low power consumption device, and the Wi-Fi low power consumption device sends a ProbReq packet carrying a vendor-specific information element for the query; all the proxy devices that have received the ProbReq packet may respond with a ProbResp packet or Beacon packet. The proxy devices which support the query information element carried in the ProbReq packet may, according to their pairing states, respond with a ProbResp packet or Beacon packet carrying a query response vendor-specific information element. The Wi-Fi low power consumption device may, according to the pairing state indicated by the query response information element in the received ProbResp packet or Beacon packet, filters and keeps MAC addresses of pairable proxy devices, and according to a signal strength when receiving the corresponding ProbResp packet or Beacon packet, estimate the obtained RSSI (Received Signal Strength Indication, i.e., an indication of the strength of a received signal) value, sort the MAC addresses in a reverse order by RSSI and generate a MAC address list. The order in said MAC address list will be updated in real-time according to the RSSI in the received ProbResp packet or Beacon packet. After a preset time has lapsed, stop updating the MAC address list, and an indicator light on the front of the Wi-Fi low power consumption device provides an indication, indicating that the current search process for illumination devices by the user has completed, and may proceed to the next step of operation.

2) the user confirms the correct waiting-for-configuration proxy devices: the user presses the configuration button of the Wi-Fi low power consumption device once, and the Wi-Fi low power consumption device, according to the MAC address ranked first in the above described MAC address list, sends a ProbReq packet carrying vendor-specific information element for indication control. The proxy device receiving the unicasted ProbReq packet provides light indication according to the vendor-specific information element, prompting the illumination device corresponding to the current MAC address to the user, for confirmation of the user. When the user confirms that the indicated device is a proxy device waiting-for-pairing, press the switch button on the front to confirm; otherwise repeat the above described steps, until all the MAC addresses in the MAC address list have received corresponding ProbReq packets and the corresponding proxy devices have completed indication, then the pairing confirmation process ends.

When exchange of other pairing information besides MAC address, such as key information, encryption mode information between the proxy device and the Wi-Fi low power consumption device is automatically completed through Action packets, the pairing information is carried in the vendor-specific information element on the Action packet.

When the user completes the pairing operation, through simultaneous pressing of the switch button and the configuration button on the front, the Wi-Fi low power consumption device sends a ProbReq packet carrying locking instruction vendor-specific information element to all the proxy devices paired therewith, the corresponding proxy devices which have received the ProbReq packet will update their own states to paired-and-locked.

When the user needs to add more Wi-Fi low power consumption devices to the proxy device, through simultaneous pressing and holding of the switch button and the configuration button on the front of the paired Wi-Fi low power consumption device, the Wi-Fi low power consumption device will send a ProbReq packet carrying unlocking instruction vendor-specific information element to all the proxy devices paired therewith; the corresponding proxy devices which have received the ProbReq packet will update their own states to a waiting-for-pairing state, that is, perform pairing again according to steps S11 to S13 for other Wi-Fi low power consumption devices.

The present invention can implement a method and apparatus for MAC layer pairing between a wiring free Wi-Fi IoT illumination switch and a standard Wi-Fi IoT illumination device, utilize a limited number of buttons and indicator lights on the wiring free Wi-Fi IoT illumination switch, to control the Wi-Fi IoT illumination switch by way of preset buttons, and implement a pairing process with a user-selected Wi-Fi IoT illumination device. The user determines the intermediate state of the pairing process through different indication modes of the indicator lights on the illumination device and the switch, allowing the switch and the illumination device to obtain the MAC addresses, communication keys of each other, until completion of pairing is confirmed. The paired proxy device and Wi-Fi illumination switch will recognize each other by the MAC addresses, so as to perform control.

Different information during the pairing process, such as waiting-for-configuration query, illumination device behavior control, indication instruction, and encryption related information, may be carried in the vendor-specific information element for exchange. As prescribed by Wi-Fi standard protocols, vendors and suppliers may define vendor-specific information elements to be carried in management packets according to application requirements.

In the present invention, after a triggering condition is satisfied, said low power consumption device operates and transmits control information to said proxy device, the step of the proxy device forwarding the received information or controlling other devices according to the received information comprising the following steps of:

loading data in a packet payload structure defined in MAC layer of the Wi-Fi low power consumption device, performing data pre-exchange with the proxy device via a MAC layer link; the proxy device using the data received in the pre-exchange to perform data interaction with the cloud server via IP layer and above layer link through the IP address and high level protocol specified in packet payload in MAC layer. When the cloud server needs to transmit data to the low power consumption device, and the low power consumption device is in a sleeping state, the proxy device acting as a data receiving end to receive and buffer data sent from the cloud server, and after a current low power consumption sleeping state of the Wi-Fi low power consumption device is ended, transmitting the buffered internet data via the previously established low power consumption Wi-Fi MAC layer link.

In the present invention, when the Wi-Fi low power consumption device is about to enter into the low power consumption sleeping state, loading a sleep start signal to be sent to the proxy device in the MAC packet payload to be sent; when the Wi-Fi low power consumption device exits the low power consumption sleeping state and needs to transmit data over the previously established low power consumption Wi-Fi MAC layer link, loading a sleep end signal in the MAC packet payload to be sent and sending the sleep end signal; the proxy device periodically listening to the above described sleep start signal and sleep end signal, and correspondingly starting an internet data buffering process or pre-exchange data forwarding process between the proxy device and the cloud server. When the Wi-Fi low power consumption device ends sleeping and is ready to transmit data, if its sleeping time does not exceeds a maximum wake-up period of the low power consumption Wi-Fi MAC layer link, then the low power consumption Wi-Fi MAC layer link between the device and the IoT proxy device has not been disconnect, so data pre-exchange can be performed directly via the previous low power consumption Wi-Fi MAC layer link; when the sleeping time exceeds the maximum wake-up period set for the low power consumption Wi-Fi MAC layer link, then the low power consumption Wi-Fi MAC layer link between the device and the IoT proxy device has been disconnected, and it is needed to firstly establish the link according to the above described process for establishing the low power consumption Wi-Fi MAC layer link, and then perform data pre-exchange over the low power consumption Wi-Fi MAC layer link.

In the present invention, the Wi-Fi low power consumption device only establishes a low power consumption Wi-Fi MAC layer link with the proxy device, without a conventional Wi-Fi link IP layer and above layer link, because the link implements a private protocol, according to requirements, it is possible to set a very long maximum wake-up period (e.g., several hundred hours), which may ensure that during sleeping of the Wi-Fi low power consumption device having a long data period, the low power consumption Wi-Fi MAC layer link will not be disconnected; the low power consumption Wi-Fi MAC layer link may be established through authentication and encryption over a conventional standard Wi-Fi MAC layer link or established through a non-standard privately defined MAC layer link. The proxy device uses a standard 802.11 protocol to connect to the Wi-Fi access point so as to connect to the internet server. In the present invention, the MAC layer packet payload includes: a data portion and a payload header (server IP address and high level protocol type) encapsulating the data portion, wherein: the data portion including a data type, a data body, and a sleep flag; and the proxy device determines a path for forwarding the data according to the IP address in the MAC layer packet payload, and determines a high level link according to the high level protocol type. Said data portion carries various data including sensor measurement data, device sleep start/end signal, control command, control command response, event notification, etc., and may be customized according to scenarios of application.

In order to achieve the optimal low power consumption mode, the maximum wake-up period of the connection may, according to scenarios of application, be configured to a suitable time, so as to reduce re-establishment of the low power consumption Wi-Fi MAC layer connection as much as possible. The low power consumption sleeping state of said Wi-Fi low power consumption device may be implemented as but does not limit to several hours, several days, or several months, wherein the low power consumption sleeping state may be ended periodically (e.g., a Wi-Fi temperature sensor of a home temperature monitoring network may be set to acquire current temperature every 4 hours; or it may be ended non-periodically (e.g., when a Wi-Fi illumination switch is touched by a user). When the Wi-Fi IoT device having a long data period needs software upgrade for itself: it utilizes said low power consumption Wi-Fi MAC layer link to obtain upgraded software from the internet server via the proxy device; or the Wi-Fi low power consumption device connects to the internet server via a normal Wi-Fi link with the AP, and obtains upgraded software.

When the Wi-Fi low power consumption device having a long data period is a Wi-Fi illumination switch, and the Wi-Fi IoT proxy device is a Wi-Fi illumination device, possible data exchange scenarios include, but not limit to, the following two scenarios: 1) the Wi-Fi illumination switch does not need to perform data exchange with the internet server; the Wi-Fi illumination switch and the Wi-Fi illumination device transmit illumination control information over a low power consumption Wi-Fi link; and the Wi-Fi illumination device does not forward the control information. 2) When the IoT cloud server counts a number of switch actuations, each time a user touches the Wi-Fi low power consumption device to control the Wi-Fi illumination device, illumination control information will be transmitted to the Wi-Fi illumination device via the low power consumption Wi-Fi link; the Wi-Fi illumination device may always maintain the link to the server or re-establish the link to the server, so as to send the actuation information of the Wi-Fi low power consumption device to the server via the Wi-Fi access point, for counting the number of actuations of the Wi-Fi low power consumption device.

Figure 11:
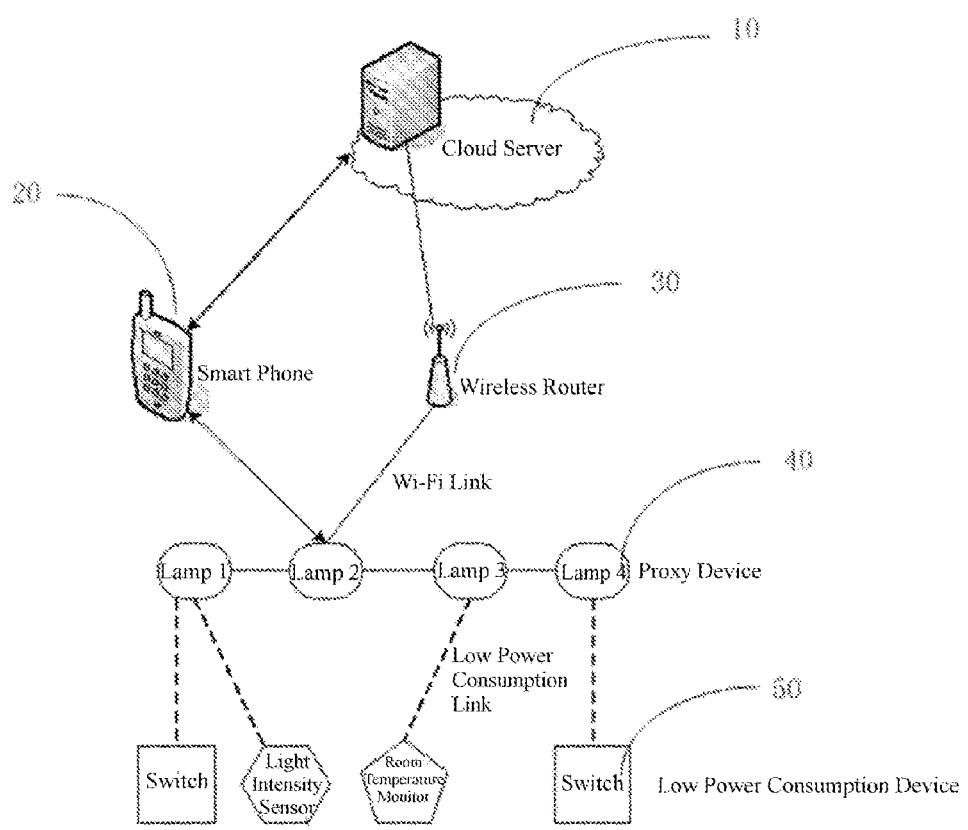
FIG. 11 is an exemplary structure diagram of an IoT system for secure low power consumption proxy devices according to the present invention.

As shown in FIG. 11, an IoT configuration system for secure low power consumption proxy devices includes: a cloud server 10, an intelligent terminal 20, a wireless router 30, proxy devices 40, and Wi-Fi low power consumption devices 50. The cloud server 10 performs data storage of user information; wireless router 30 connects said Wi-Fi IoT device and said cloud server; Wi-Fi low power consumption device 50 sends control information by way of loading a private information structure in a Wi-Fi unicast packet or multicasting packet; Wi-Fi intelligent lamp 40 performs wireless connection and pairing by way of receiving the control information from said Wi-Fi low power consumption device, and said proxy device can send information packet to said Wi-Fi low power consumption device, and receive the indication instruction corresponding to the MAC address of said proxy device sent from said Wi-Fi low power consumption device In the present invention, the cloud server implements authentication of the devices, user management, message forwarding, and data storage, saving the MAC Address, device secure information such as device private key (Owner Key) and master private key (Master Key), and user secure information such as user account and authentication certificate of each Wi-Fi low power consumption device. The user performs registration through the intelligent terminal; the IoT management system registers the user information; the cloud server allocates a unique corresponding user identity identification to the current user, and implements secure bonding between the intelligent terminal and the intelligent terminal software, and the intelligent terminal software establishes a SSL secure connection with the cloud server.

Figure 12:
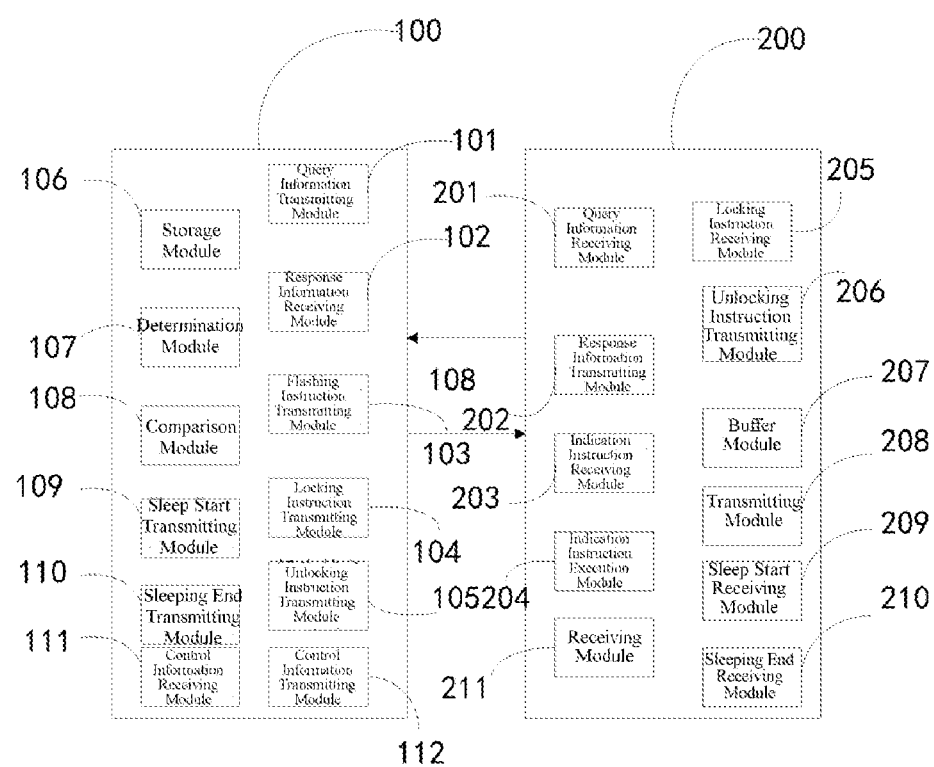
FIG. 12 is a structural block diagram of a Wi-Fi low power consumption device and a proxy device according to the present invention.

As shown in FIG. 12, in the present invention, the Wi-Fi low power consumption device 100 is wirelessly connected and paired with the proxy device 200; said proxy device 200 may send information packet to said Wi-Fi low power consumption device 100, and receive an indication instruction corresponding to a MAC address of the proxy device 200 sent from said Wi-Fi low power consumption device 100. Said information packets include: waiting-for-configuration query information packet, response information packet, indication instruction information packet, or encryption information packet, wherein:

Said waiting-for-configuration query information packet comprises: a query for illumination device locking state or a number of paired switches; said response information packet comprises: a response to the waiting-for-configuration query information packet; said indication instruction information packet comprises: a MAC address of the indication illumination device, a flash frequency or hold time of the illumination device; said encryption information packet comprises: a communication key or an encryption mode.

Said Wi-Fi low power consumption device 100 includes: a query information transmitting module 101, a response information receiving module 102, an indication instruction transmitting module 103, a locking instruction transmitting module 104, an unlocking instruction transmitting module 105, a storage module 106, a determination module 107, a comparison module 108, a sleep start transmitting module 109, a sleeping end transmitting module 110, a control information receiving module 111, and a control information transmitting module 112.

The query information transmitting module 101 sends a waiting-for-configuration query information packet to the proxy devices; the response information receiving module 102 receives response information packets containing MAC addresses sent from said proxy devices; the storage module 107 stores said response information packets containing the MAC addresses; the determination module 107 determines configurable proxy devices according to waiting-for-configuration state information in the response information packets; the comparison module 108 sorts the obtained MAC addresses of the configurable proxy devices according to RSSI values of the response information packets, and generates a list of MAC addresses waiting for configuration; the indication instruction transmitting module 103 sends an indication instruction information packet to said proxy devices; the locking instruction transmitting module 104 sends a pairing locking instruction information packet; and the unlocking instruction transmitting module 105 sends an unlocking instruction information packet. The control information transmitting module 111 sends control information to said proxy devices. The control information receiving module 112 receives the control information for said proxy devices. The sleep start transmitting module 109, when said Wi-Fi low power consumption device is about to enter into the low power consumption sleeping state, loads a sleep start signal to be sent to the proxy device into the MAC packet payload to be sent; and the sleeping end transmitting module 110, when said Wi-Fi low power consumption device exits the low power consumption sleeping state, loads a sleep end signal into the MAC packet payload to be sent and sends the sleep end signal.

Said proxy device including: a query information receiving module 201, a response information transmitting module 202, an indication instruction receiving module 203, an indication instruction execution module 204, a locking instruction receiving module 205, an unlocking instruction transmitting module 206, a buffer module 207, a transmitting module 208, a sleep start receiving module 209, a sleeping end receiving module 210, and a receiving module 211. The query information receiving module 201 receives the waiting-for-configuration query information packet sent from the Wi-Fi low power consumption device; the response information transmitting module 202 transmits a response information packet containing the MAC address; the indication instruction receiving module 203 receives the indication instruction information packet sent from said Wi-Fi low power consumption device; the indication instruction execution module 204 executes the indication instruction; the locking instruction receiving module 205 receives a pairing locking instruction information packet; and the unlocking instruction transmitting module 206 receives an unlocking instruction information packet. The receiving module 211 receives control information sent from said Wi-Fi low power consumption device and data sent from said cloud server; the buffer module 207, when the Wi-Fi IoT device is in the low power consumption sleeping state, stores data sent from said cloud server; and the transmitting module 208 sends the data sent from the cloud server and stored by said buffer module to said Wi-Fi low power consumption device. The sleep start receiving module 209 receives the sleep start signal sent from said Wi-Fi low power consumption device; and the sleeping end receiving module 210 receives the sleep end signal sent from said Wi-Fi low power consumption device.

The present invention includes a wiring free Wi-Fi low power consumption device having a switch button and an indicator light on its front side, and a configuration button on its back side; a proxy device which supports a softAP mode, and the Wi-Fi IoT illumination device supports an agreed MAC layer pairing manner between the wiring free Wi-Fi low power consumption device and the Wi-Fi IoT illumination device, and at the same time supports standard Wi-Fi functions, so as to be able to connect to an AP in a conventional manner, and connect to the external network through the AP.

In the present invention, the user uses Wi-Fi function of the intelligent terminal to receive beacons so as to discover Wi-Fi APs around, and the intelligent terminal software may scan and recognize Soft AP information of the Wi-Fi proxy devices, and display them in a device list; after the user select a certain proxy device in the device list, for example lamp 2 in this embodiment, which is called master device, a secure data path is established with the cloud server through a method for establishing secure connection with the cloud server via Wi-Fi and authorization.

After the lamp 2 successfully connects to the internet via the wireless router, the mobile terminal controls the lamp 2 so as to send the identity information of the lamp 2 to the cloud server in a manner supporting SSL secure communication, and the cloud server reactivates and authenticates the identity information, specifically: the proxy device sends an activation data packet to the cloud server; after having received the information, the cloud server approves the activation of the proxy device, and sends an activation request response to the proxy device; the proxy device sends an authentication data packet to the cloud server; the cloud server performs identity authentication on the proxy device according to the authentication data packet, and when the authentication is successful, sends a response to the proxy device confirming that the identity authentication is successful.

Then it uses a point-to-multipoint manner to authenticate and configure other proxy devices in the Wi-Fi IoT, such as lamp 1, lamp 3, and lamp 4, through the master device, such that lamp 1, lamp 3, and lamp 4 establish a secure connection with the cloud server and obtain authorization through lamp 2, thereby forming a network backbone.

After the network backbone is established, the mobile phone intelligent terminal software may randomly generate a new encryption password to send and notify the Wi-Fi intelligent lamp 1, lamp 2, lamp 3, and lamp 4 to uniformly update WPA/WPA2 password to be used for data connection, and replace the factory default connection password used by the devices in the network; after the password update is completed, the mobile phone sends the encryption password to the cloud server in a data encryption manner via a secure connection, and the cloud server updates its stored BSSID and WPA/WPA2 password information of the Wi-Fi low power consumption device.

After the network backbone is established, the Wi-Fi intelligent lamps operate as Wi-Fi IoT proxy devices in a low power consumption IoT architecture based on proxy devices; the Wi-Fi low power consumption devices, Wi-Fi light intensity sensors, operate as Wi-Fi IoT low power consumption devices; a Wi-Fi MAC layer connectionless mode is utilized to perform pairing; after pairing is completed, secure data paths are established between the Wi-Fi intelligent lamps and Wi-Fi low power consumption devices, and between the Wi-Fi intelligent lamps and the Wi-Fi light intensity sensors in a MAC layer data encryption mode. By default, the Wi-Fi low power consumption devices operate in a sleeping state, so as to achieve very low standby power consumption; and after the system has detected a press event, the Wi-Fi low power consumption devices resume to a normal operating state, so as to send switch information to the Wi-Fi intelligent lamps in the Wi-Fi MAC layer connectionless mode. By default, the Wi-Fi light intensity sensors operate in a sleeping state, so as to achieve very low standby power consumption; and after the light intensity exceeds a set threshold value, the Wi-Fi light intensity sensors resume to a normal operating state, so as to send switch information to the Wi-Fi intelligent lamps in the Wi-Fi MAC layer connectionless mode.

Pairing between the Wi-Fi intelligent lamp and the Wi-Fi low power consumption device using the Wi-Fi MAC layer connectionless mode is performed through a wiring free pairing method. Firstly, the intelligent terminal already authenticated by the system uses the secure data connection to send information of the Wi-Fi low power consumption device to the cloud server for authentication; after identity authentication is passed, the cloud server sends a temporary encryption key of the Wi-Fi low power consumption device to the mobile phone; the mobile phone sends the MAC address of the Wi-Fi low power consumption device to the Wi-Fi intelligent lamps in the network, and notifies four Wi-Fi intelligent lamps that the pairing request from the Wi-Fi low power consumption device is acceptable, and at the same time, manually controls the Wi-Fi low power consumption devices to enter into a pairing request mode and actively sends pairing request information to the Wi-Fi intelligent lamps; after the Wi-Fi intelligent lamps receive the pairing request from the Wi-Fi low power consumption device, seek confirmation from the mobile phone; the mobile phone application software prompts the user for confirmation; after the user has confirmed, the mobile phone sends confirmation approval information which at the same time contains the temporary key for used by the Wi-Fi low power consumption device in the MAC layer connectionless mode; the Wi-Fi intelligent lamp and the Wi-Fi low power consumption device use the temporary key to encrypt communication data in the pairing process; the Wi-Fi intelligent lamp randomly generates a new key and send it to the switch; the Wi-Fi intelligent lamp and the Wi-Fi low power consumption device save the new key, and use the new key to encrypt communication data in the MAC layer connectionless mode, and then complete various types of initial data exchange.

The above described process establishes a basic wireless intelligent network, in which the intelligent lamp establishes a TCP long link with the cloud server; the smart phone may communicate with the Wi-Fi intelligent lamp through the cloud server; a room temperature monitor wakes up from the sleeping state every period of time (e.g., 5 minutes), and sends temperature values to the Wi-Fi intelligent lamp in the MAC layer connectionless mode; the intelligent lamp forwards the data to the cloud server; and the smart phone may obtain data of the temperature sensor through the cloud server.

In the IoT configuration method and system for secure low power consumption proxy devices according to the present invention, the intelligent lamp establishes a TCP long link with the cloud server; the intelligent terminal may communicate with the Wi-Fi intelligent lamp through the cloud server; a room temperature monitor wakes up from the sleeping state every interval of time (e.g., 5 minutes), and sends temperature values to the Wi-Fi intelligent lamp in the MAC layer connectionless mode; the intelligent lamp forwards the data to the cloud server; and the intelligent terminal may obtain data of the temperature sensor through the cloud server.

Buffer memory is provided in the proxy device of the present invention. Said proxy device and the Wi-Fi low power consumption device support low power consumption Wi-Fi link, may support the function of data transmission with super long interval, and may perform data exchange with the Wi-Fi low power consumption device having a long data period. Said IoT proxy device is not limited to have additionally complete Wi-Fi low power consumption device functions, so as to perform its own data exchange with the access point. If the Wi-Fi illumination device operates as the IoT proxy device, after connected to the Wi-Fi access point, it may also be controlled by the mobile phone application to receive illumination control commands transmitted through the Wi-Fi access point. When the Wi-Fi low power consumption device needs to perform data exchange with the internet server (e.g., IoT cloud server), it loads data in packet payload defined in MAC layer, performs data pre-exchange with the proxy device via said low power consumption Wi-Fi MAC layer link, and after the pre-exchange having completed, enters into the low power consumption sleeping state (turning of wireless transceiving portion, etc.), and the proxy device forwards the data received in the pre-exchange to the cloud server via IP layer and above layer link through the IP address and high level protocol (e.g., TCP) specified in packet payload in MAC layer. Said MAC layer packet payload includes: a data portion and a payload header encapsulating the data portion, wherein: the data portion includes a data type, a data body, and a sleep flag; the payload header includes server IP address and high level protocol type (e.g., TCP, UDP, etc.). Said proxy device determines a path for forwarding the data according to the IP address in the MAC layer packet payload, and determines a high level link according to the high level protocol type. Said data type includes: Command, Response, and Event, wherein: Command type is sent by the IoT device, and its data body may carry query, control information, etc. Response type is for response to the IoT device from the IoT proxy device, and its data body portion carries information forwarded from the server to the device. Event type is the main data transmission type, and its data body portion may carry sensor measurement data, etc. Since under most circumstances, after sleeping is ended, the IoT device only sends small amount of data carried on Event type, and does not need to perform data exchange with the server, so it is temporarily provided herein that the device sleep start/end flag is only carried in a tail portion of the Event data portion. If the Wi-Fi low power consumption device is a Wi-Fi temperature sensor device, it acquires temperature information and sends the temperature information to the server at a period of several hours; the Wi-Fi proxy IoT device is a Wi-Fi socket or Wi-Fi illumination device nearby. When the Wi-Fi IoT is initially constructed, interlinks of the whole network are established as follows. The link between the Wi-Fi low power consumption device having a long data period and the proxy device: it may be established through a process for establishing a Wi-Fi MAC layer link via a private protocol, or it may be established through a process for establishing a normal Wi-Fi MAC layer link. Subsequently, a data exchange period and a preset period start time are respectively negotiated, and at this point, establishment of each low power consumption Wi-Fi MAC layer link is completed. Each time after the Wi-Fi low power consumption device having a long data period wakes up at an agreed period, it does not have to establish a link with the proxy device again, but may perform data exchange directly. The link between the proxy device and the Wi-Fi access point P: a Wi-Fi link is established through a process for establishing a normal Wi-Fi link. Because the proxy device has sufficient energy supply, it does not have to sleep. Data exchange process in the Wi-Fi IoT: if the proxy device needs to perform data exchange (may be its own data) with the Wi-Fi access point P, normal Wi-Fi data exchange may be immediately completed. If not in the agreed wake time, data to be transmitted from the IoT cloud server to the Wi-Fi low power consumption devices having a long data period via the Wi-Fi access point P will be buffered by the proxy device. At other times, the proxy device may listen to the wake-up of each Wi-Fi low power consumption device having a long data period, so as to prevent clock skew of the Wi-Fi low power consumption device having a long data period which is in the sleeping state. When proxy device heard the wake-up of the Wi-Fi low power consumption device, it receives the data generated by the Wi-Fi low power consumption device, and transmits the buffered data to the corresponding Wi-Fi low power consumption device having a long data period. After having completed the data exchange with the Wi-Fi low power consumption device having a long data period, and the device enters into sleeping, the proxy device sends the data obtained from the Wi-Fi low power consumption device having a long data period via the Wi-Fi access point P to the cloud server again.

The above described are only preferred embodiments of the present invention, and do not limit the present invention; any modification, equivalent substitution, improvement, etc. made within the spirits and principles of the present invention shall fall into the scope of protection of the present invention.

The invention claimed is:

1. An IoT configuration method for secure low power consumption proxy devices, wherein the method comprises:
   registering an intelligent terminal and securely bonding the intelligent terminal to a Wi-Fi IoT device;
   using a secure manner to configure the Wi-Fi IoT device in a Wi-Fi IoT network as a master proxy device or master device, and then using a point-to-multipoint manner to authenticate and configure other proxy devices in a same group with the master proxy device in the Wi-Fi IoT network through the master device;
   establishing a secure data path between one of the master and other proxy devices and a Wi-Fi low power consumption device;
   pairing the one of the master and other proxy devices with the Wi-Fi low power consumption device in a Wi-Fi MAC layer connectionless mode;
   after a triggering condition is satisfied, said Wi-Fi low power consumption device operating and transmitting control information to said one of the master and other proxy devices, and the one of the master and other proxy devices forwarding the received control information or controlling other devices according to the received control information;
   wherein the step of using a secure manner to configure the Wi-Fi IoT device in a Wi-Fi IoT network as a master proxy device or master device, and then using a point-to-multipoint manner to authenticate and configure other proxy devices in a same group with the master proxy device in the Wi-Fi IoT network through the master device comprises:
      when a user uses the intelligent terminal to discover the master device in a Wi-Fi Soft-AP mode, the intelligent terminal connects with the master device in an encryption mode; then the user transmits configuration information from the intelligent terminal to the Wi-Fi IoT device;
      when the master device is connected via a wireless router to an IoT cloud server via an encryption protected link and enters into an operating mode, the master device uses the Wi-Fi Soft-AP mode to allow access from other proxy devices which are in the same group and in a waiting for-configuration mode, while the other proxy devices use a Wi-Fi STA mode to seek and try to access the master device.

2. The IoT configuration method for secure low power consumption proxy devices according to claim 1, wherein the step of registering an intelligent terminal and securely bonding the intelligent terminal to a Wi-Fi IoT device comprises:
   an activation process, which registers the intelligent terminal with a cloud server upon a first time connection;
   an authentication process, which reactivates and authenticates the intelligent terminal with the cloud server through identity information.

3. The IoT configuration method for secure low power consumption proxy devices according to claim 1, wherein the step of pairing the one of the master and other proxy devices with the Wi-Fi low power consumption device in a Wi-Fi MAC layer connectionless mode comprises:
   the Wi-Fi low power consumption device receiving information packets from different proxy devices in a wireless manner;

the Wi-Fi low power consumption device sending an instruction corresponding to a MAC address of the one of the master and other proxy devices;

pairing the Wi-Fi low power consumption device with the one of the master and other proxy devices.

4. The IoT configuration method for secure low power consumption proxy devices according to claim 3, wherein said information packets comprise: waiting-for-configuration query information packet, response information packet, indication instruction information packet, or encryption information packet, wherein:

said waiting-for-configuration query information packet comprises: a query for illumination device locking state or a number of paired switches;

said response information packet comprises: a response to the waiting-for-configuration query information packet;

said indication instruction information packet comprises: a MAC address of the illumination device, a flash frequency or hold time of the illumination device;

said encryption information packet comprises: a communication key or an encryption mode.

5. The IoT configuration method for secure low power consumption proxy devices according to claim 4, wherein the step of the Wi-Fi low power consumption device receiving information packets from different proxy devices in a wireless manner comprises:

the Wi-Fi low power consumption device to be paired sending the waiting-for-configuration query information packet to the different proxy devices;

the different proxy devices which receive the waiting-for-configuration query information packet sending a response information packet;

said Wi-Fi low power consumption device receiving the response information packets containing a MAC address;

said Wi-Fi low power consumption device filtering configurable proxy devices based on waiting-for-configuration state information in the response information packets;

said Wi-Fi low power consumption device sorting the obtained MAC addresses of the configurable proxy devices according to RSSI values obtained when receiving the response information packets.

6. The IoT configuration method for secure low power consumption proxy devices according to claim 5, wherein when said Wi-Fi low power consumption device sorts the obtained MAC addresses of the configurable proxy devices, MAC addresses with larger RSSI value take higher priority.

7. The IoT configuration method for secure low power consumption proxy devices according to claim 3, wherein the method further comprises the following step of:

the Wi-Fi low power consumption device sending a pairing locking instruction to the one of the master and other proxy devices, so as to lock the one of the master and other proxy devices.

8. The IoT configuration method for secure low power consumption proxy devices according to claim 7, wherein the step of the Wi-Fi low power consumption device sending a pairing locking instruction to the one of the master and other proxy devices so as to lock the one of the master and other proxy devices comprises:

the Wi-Fi low power consumption device sending an information packet carrying the locking instruction to the one of the master and other proxy devices paired therewith;

after having received the information packet carrying the locking instruction, the one of the master and other proxy devices updating its own state to paired-and-locked.

9. The IoT configuration method for secure low power consumption proxy devices according to claim 8, wherein the method further comprises:

the paired Wi-Fi low power consumption device sending an unlock instruction information packet to the one of the master and other proxy devices, so as to unlock the one of the master and other proxy devices.

10. The IoT configuration method for secure low power consumption proxy devices according to claim 7, wherein the step of the paired Wi-Fi low power consumption device sending an unlock instruction information packet to the one of the master and other proxy devices so as to unlock the one of the master and other proxy devices comprises:

the Wi-Fi low power consumption device sending locking instruction information packets to all proxy devices paired therewith;

the proxy devices receiving the locking instruction information packets, and updating their own states to a waiting-for-pairing state.

11. The IoT configuration method for secure low power consumption proxy devices according to claim 4, wherein the step of the Wi-Fi low power consumption device sending an indication instruction corresponding to a MAC address of the one of the master and other proxy devices comprises:

the Wi-Fi low power consumption device to be paired sending the indication instruction information packet to the different proxy devices according to an order of RSSI value's priority;

after having received the indication instruction information packet, the one of the master and other proxy devices gives a light indication or sound, action as confirmation.

12. The IoT configuration method for secure low power consumption proxy devices according to claim 4, wherein the step of pairing the Wi-Fi low power consumption device with the one of the master and other proxy devices comprises:

the Wi-Fi low power consumption device receiving corresponding information packets from the different proxy devices in a wireless manner;

the Wi-Fi low power consumption device sending an indication instruction corresponding to the MAC address of the one of the master and other proxy devices so as to facilitate the user in determining one of the master and other proxy devices to be paired from the different proxy devices and perform pairing.

13. The IoT configuration method for secure low power consumption proxy devices according to claim 1, wherein after a triggering condition is satisfied, said Wi-Fi low power consumption device operates and transmits control information to said one of the master and other proxy devices, the steps of the one of the master and other proxy devices forwarding the received control information or controlling the other devices according to the received control information comprising:

loading data in a packet payload structure defined in MAC layer of the Wi-Fi low power consumption device, performing data pre-exchange with the one of the master and other proxy devices via a MAC layer link;

the one of the master and other proxy devices using the data received in the pre-exchange to perform data interaction with the cloud server via IP layer and above layer link through the IP address and high level protocol specified in packet payload in MAC layer.

14. The IoT configuration method for secure low power consumption proxy devices according to claim 13, wherein the method further comprises the following steps of:
   when the Wi-Fi low power consumption device is about to enter into the low power consumption sleeping state, loading a sleep start signal to be sent to the one of the master and other proxy devices in the MAC packet payload to be sent;
   when the Wi-Fi low power consumption device exits the low power consumption sleeping state and needs to transmit data over the previously established low power consumption Wi-Fi MAC layer link, loading a sleep end signal in the MAC packet payload to be sent and sending the sleep end signal;
   the one of the master and other proxy devices periodically listening to the above described sleep start signal and sleep end signal, and correspondingly starting an internet data buffering process or pre-exchange data forwarding process between the one of the master and other proxy devices and the cloud server.

15. The IoT configuration method for secure low power consumption proxy devices according to claim 14, wherein the method further comprises:
   when the Wi-Fi low power consumption device ends sleeping and is ready to transmit data, if its sleeping time does not exceeds a maximum wake-up period of the low power consumption Wi-Fi MAC layer link, then the low power consumption Wi-Fi MAC layer link between the Wi-Fi low power consumption device and the one of the master and other proxy devices has not been disconnect, so data pre-exchange can be performed directly via the previous low power consumption Wi-Fi MAC layer link;
   when the sleeping time exceeds the maximum wake-up period set for the low power consumption Wi-Fi MAC layer link, then the low power consumption Wi-Fi MAC layer link between the Wi-Fi low power consumption device and the one of the master and other proxy devices has been disconnected, and it is needed to firstly establish the link according to the above described process for establishing the low power consumption Wi-Fi MAC layer link, and then perform data pre-exchange over the low power consumption Wi-Fi MAC layer link.

16. The IoT configuration method for secure low power consumption proxy devices according to claim 1, wherein after a triggering condition is satisfied, said Wi-Fi low power consumption device operates and transmits control information to said one of the master and other proxy devices, and the step of the one of the master and other proxy devices forwarding the received control information to the other devices or controlling the other devices according to the received control information includes:
   the one of the master and other proxy devices acting as a data receiving end to receive and buffer data sent from the cloud server, and after a current low power consumption sleeping state of the Wi-Fi low power consumption device is ended, transmitting the buffered internet data via the previously established low power consumption Wi-Fi MAC layer link.

17. A system for implementing the IoT configuration method for secure low power consumption proxy devices according to claim 1, wherein the system comprises:
   the intelligent terminal;
   a cloud server, which performs data storage of user information;
   a wireless router, which connects said Wi-Fi IoT device and said cloud server;
   the Wi-Fi low power consumption device, which sends control information by way of loading a private information structure in a Wi-Fi unicast packet or multicasting packet;
   the master and other proxy devices, which perform wireless connection and pairing by way of receiving the control information from said Wi-Fi low power consumption device, send information packets to said Wi-Fi low power consumption device, and receive an indication instruction corresponding to an MAC address of said one of the master and other proxy devices sent from said Wi-Fi low power consumption device.

18. The system according to claim 17, wherein said information packets comprise:
   waiting-for-configuration query information packet, response information packet, indication instruction information packet, or encryption information packet, wherein:
   said waiting-for-configuration query information packet includes: query proxy device locking state or a number of paired Wi-Fi low power consumption devices;
   said response information packet includes: a response to the waiting-for-configuration query information packet;
   said indication instruction information packet includes: the MAC address of the one of the master and other proxy devices, a flash frequency, hold time or sound, action information of the one of the master and other proxy devices;
   said encryption information packet includes: a communication key or an encryption mode.

19. The system according to claim 18, wherein said Wi-Fi low power consumption device comprises:
   a query information transmitting module, which sends a waiting-for-configuration query information packet to the master and other proxy devices;
   a response information receiving module, which receives response information packets containing MAC addresses sent from said master and other proxy devices;
   a storage module, which stores said the response information packets containing the MAC addresses;
   a determination module, which determines configurable proxy devices according to waiting-for-configuration state information in the response information packets;
   a comparison module, which sorts the obtained MAC addresses of the configurable proxy devices according to RSSI values of the response information packets, and generates a list of MAC addresses waiting for configuration;
   an indication instruction transmitting module, which sends an indication instruction information packet to said master and other proxy devices;
   a control information transmitting module, which sends control information to said one of the master and other proxy devices;
   a control information receiving module, which receives the control information for said one of the master and other proxy devices.

20. The system according to claim 18, wherein said Wi-Fi low power consumption device further comprises:
- a locking instruction transmitting module, which sends a pairing locking instruction information packet;
- an unlocking instruction transmitting module, which sends an unlocking instruction information packet;
- a sleep start transmitting module which, when said Wi-Fi low power consumption device is about to enter into the low power consumption sleeping state, loads a sleep start signal to be sent to the one of the master and other proxy devices into the MAC packet payload to be sent;
- a sleeping end transmitting module which, when said Wi-Fi low power consumption device exits the low power consumption sleeping state, loads a sleep end signal into the MAC packet payload to be sent and sends the sleep end signal.

21. The system according to claim 18, wherein said master and other proxy devices comprise:
- a query information receiving module, which receives the waiting-for-configuration query information packet sent from the Wi-Fi low power consumption device;
- a response information transmitting module, which transmits a response information packet containing the MAC address;
- an instruction receiving module, which receives the instruction information packet sent from said Wi-Fi low power consumption device;
- an instruction execution module, which executes the received instruction;
- a receiving module, which receives control information sent from said Wi-Fi low power consumption device and data sent from said cloud server;
- a buffer module which, when the Wi-Fi IoT device is in the low power consumption sleeping state, stores data sent from said cloud server;
- a transmitting module, which sends the data sent from the cloud server and stored by said buffer module to said Wi-Fi low power consumption device.

22. The system according to claim 21, wherein said master and other proxy devices further comprise:
- a locking instruction receiving module, which receives a pairing locking instruction information packet;
- an unlocking instruction transmitting module, which receives an unlocking instruction information packet;
- a sleep start receiving module, which receives the sleep start signal sent from said Wi-Fi low power consumption device;
- a sleeping end receiving module, which receives the sleep end signal sent from said Wi-Fi low power consumption device.

* * * * *